(12) United States Patent
Näslund

(10) Patent No.: US 6,223,031 B1
(45) Date of Patent: *Apr. 24, 2001

(54) PROCESS AND DEVICE FOR QUALITY DETERMINATION

(75) Inventor: Jonas Anders Näslund, Sollentuna (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,007

(22) Filed: Jul. 3, 1997

(30) Foreign Application Priority Data

Jul. 5, 1996 (SE) .................................................. 9602684

(51) Int. Cl.[7] ............................ H04M 1/24; H04M 11/00; H04B 17/00
(52) U.S. Cl. ............................. 455/423; 455/63; 455/424; 455/562; 455/514
(58) Field of Search .................................. 455/561, 562, 455/422, 423, 424, 440, 443, 444, 446, 447, 450, 509, 513, 514, 436, 437, 439, 421, 441, 442, 452, 63

(56) References Cited

U.S. PATENT DOCUMENTS

| | | | | |
|---|---|---|---|---|
| 5,038,399 | * | 8/1991 | Bruckert | 455/67 |
| 5,095,500 | * | 3/1992 | Taylor et al. | 379/32 |
| 5,179,722 | * | 1/1993 | Gunmar et al. | 455/67.3 |
| 5,309,503 | * | 5/1994 | Bruckert et al. | 379/60 |
| 5,375,123 | * | 12/1994 | Adnerson et al. | |
| 5,475,868 | | 12/1995 | Duque-Anton et al. | 455/62 |
| 5,603,092 | * | 2/1997 | Stjernholm | 455/63 |
| 5,722,048 | * | 2/1998 | Javitt | 455/53.1 |
| 5,726,978 | * | 3/1998 | Frodigh et al. | 455/63 |
| 5,845,212 | * | 12/1998 | Tanaka | 455/437 |
| 6,035,196 | * | 3/2000 | Hengeveld et al. | 455/436 |

FOREIGN PATENT DOCUMENTS

| WO 95/07011 A1 | 3/1995 | (WO) | H04Q/7/38 |
|---|---|---|---|
| WO 96/02980 A1 | 2/1996 | (WO) | H04B/1/713 |
| WO 97/23109 A1 | 6/1997 | (WO) . | |

* cited by examiner

*Primary Examiner*—Curtis Kuntz
*Assistant Examiner*—Binh K. Tieu
(74) *Attorney, Agent, or Firm*—Burns, Doane, Swecker & Mathis, L.L.P.

(57) ABSTRACT

The present invention relates to a process and a device in a radio communication system for observing the quality of channels that are to used in uplink and channels that are to be used in downlink. A quality parameter, for example the interference, is measured (301) for both uplink channels and downlink channels from a measurement receiver comprised in each base station. The measured interference is an approximation to the real downlink interference. The approximation has best correspondence with the real interference situation when the base station and the mobile stations are placed at similar height, for instance in micro- and pico cells. The measurement values can be used for adaptive allocation of frequencies or channels, or for giving statistical information about the radio communication system.

32 Claims, 5 Drawing Sheets

PROCESS AND DEVICE FOR QUALITY DETERMINATION

TECHNICAL FIELD

The present invention relates to a process and a device for observing the quality of frequencies or channels in a radio communication system. In particular it relates to a process for obtaining in a mobile radio communication system a measure of the quality of frequencies or channels which are intended to be used in the uplink and of frequencies or channels intended to be used in the downlink by generating, from the base station, values of a quality parameter for the frequencies or channels.

PRIOR ART

In a radio communication system, radio contact occurs between a primary radio station and at least one secondary radio station. The primary radio station can be a fixed base station and the secondary radio station can be a mobile station which is hand-carried or placed in a vehicle. A base station has responsibility for the radio coverage of a certain geographical area, a so-called cell.

Between a transmitter and a receiver in the radio communication system, a radio link can be established. The link is two-way, and thus one speaks of a downlink establishing the link in the direction from a base station in the radio communication system to a mobile station, and an uplink forming the link in the opposite direction from the mobile station to the base station. Transmitting and receiving of radio traffic for different links occurs on physical channels, which can be defined by a certain frequency in a Frequency Division Multiple Access system (FDMA) or by a combination of a certain frequency and a certain time slot in a Time Division Multiple Access system (TDMA). In a Code Division Multiple Access system (CDMA), a channel can be defined by a code. In general, the frequencies and the channels available in a radio communication system can be disturbed by other radio traffic to varying degrees, even by radio signals on the same channel which is used for other links, each channel in the system having a certain interference level.

In certain radio communication systems, frequency hopping is permitted, which means that a link changes between various frequencies according to a certain sequence. This can occur apparently randomized or sequentially. A frequency which proves to be of poor quality is then shared between a number of links and thus the interference for an individual link will not be as noticeable.

The spacing between an uplink frequency and the corresponding downlink frequency is called the duplex spacing. This spacing is in most radio communication systems fixed. Due to the limited number of available frequencies in a radio communication system, the same frequency must be re-used in different cells. In order to avoid interference between cells using the same channel simultaneously, so-called co-channel interference, the same frequency should not be used at the same time in adjacent cells. There should also be a certain re-used distance between two cells using channels on the same frequency.

In the GSM-system, each frequency is divided into eight time slots constituting a TDMA-frame. There are two different main types of so-called logical channels: speech channels and control channels. In each cell there is a duplex frequency pair, $c_0$, of which at least one time slot, time slot zero (T0), is only used for control channels. This frequency pair is called a BCCH-carrier, where BCCH stands for Broadcast Control Channel. Other time slots on the BCCH-carrier are used for speech channels, and other frequency pairs can be carriers of solely speech channels. On the downlink of the BCCH-carrier, the mobile station receives continuous information concerning, among other things, cell identity. Furthermore the mobile station must be able to carry out measurements of the signal strength on the BCCH-carrier of the neighbouring cells and report the measuring results on the uplink of the BCCH-carrier. This means that, regardless of whether any information is transmitted for the moment on the BCCH-carrier, the same power must be transmitted continuously. This is done by sending out so-called "dummy bursts" when a time slot is not used.

Frequency hopping is usually not used on the BCCH-carrier. Each cell has its own BCCH-carrier. It is of particular importance that this frequency pair be of good quality as regards interference, since the information sent on the control channels will, inter alia, be used by mobile stations and the base station when connecting calls, handover, signal strength measurements on the neighbouring stations, etc.

A number of closely lying cells using together all frequency pairs which are allocated to the radio communication system without re-using any frequency pair, is called a cell cluster. Extensive planning work is required to obtain optimum re-use of frequencies. Field studies are usually formed to estimate the interference situation in various parts of the radio communication system. This type of cell planning where a pattern, according to which the various frequencies or channels of the system are to be allocated to the cells to obtain the lowest disturbance level, is called fixed frequency or channel allocation.

A radio communication with a fixed frequency allocation is incapable of adapting itself to geographical changes or changes in traffic in the system. Today each base station is manually allocated a number of frequencies, and one of these is the BCCH-carrier. Various frequency pairs are used as BCCH-carriers in different cells and the BCCH-carrier is today changed manually. The network must be regularly re-adjusted and re-planned due to the building of new base stations and transceivers and due to changes in the environment, for example, the erection of new buildings or due to increased traffic within a certain area. New measurements and predictions must be made to find a suitable frequency planning. When the measurements and the allocation of frequencies are often done manually, frequency planning in a radio communication system with fixed frequency allocation, if it must be re-done, is expensive for the operators.

The cell size varies within the radio communication system depending on the user density within various geographical areas. In sparsely populated areas, a base station can cover a radius of several kilometers. In order to be able to handle a high concentration of mobile stations in densely populated areas, the cell size should be reduced. In order to achieve high capacity in a radio communication system within a densely populated geographical area, various cell layers can be superimposed.

A so-called micro cell can have a diameter of several hundred meters and cover e.g. a sports arena, thoroughfares such as crossings and streets or a portion of a highway. Characteristic of a micro cell is that its base station antenna/antennae is/are placed outdoors at below roof level.

Still smaller indoor cells, so-called pico cells, can cover e.g. a floor of a building or an entire building. There are also so-called "pico cells with distributed antenna system" which means that there are several radio antennae placed within one pico cell.

A layer with micro cells is covered by at least one macro cell, and a micro cell can in turn cover several pico cells. A covering cell is called an umbrella cell. The various layers are organized relative to each other in certain cell structures in a known manner and with certain repeating distances for the frequency of the channels included in the radio communication system.

In micro and pico cells, the base station antennae are placed below roof level, and therefore the range of an antenna is usually less than the range for a base station in a macro cell. Compared with a base station in a macrocell, a base station in a micro or pico cell is less affected by interference from surrounding base stations since fewer disturbance signals will reach the relatively lonely placed base station. This means that the same frequency can be re-used more often in a micro or pico cell than in a macro cell.

In micro and pico cells, it will be particularly ineffective to use fixed channel allocation. The layout of micro and pico cells can be very irregular and therefore it is complicated to plan a re-use pattern for the frequencies with regard to co-channel interference. The smaller the cell is, the greater will be the effects of changes in the environment, changes in the number of base stations and the number of transceivers, as well as variations in the traffic situation, and the frequency planning will have to be re-done that much more often. Large and rapid variations in the signal strength within a microcell can, for example, occur when the vehicle is driven at high speed through crossings or around street corners.

Various methods of simplifying the frequency planning and making radio communication systems adaptable to changes such as those described above have been suggested. Most methods utilize some form of Dynamic Channel Allocation (DCA) or Adaptive Frequency Allocation (AFA). The main principle for these methods is that all frequencies or channels available in the system can be used when a base station is to be allocated a frequency or channel. The indoor system DECT is one example of a radio communication system which uses dynamic channel allocation. Dynamic channel allocation uses fast algorithms. When a mobile station wants to establish a link, it choses the base station in question amongst all available channels. In such a system, the channel allocation to a cell is changed each time a call is connected. Adaptive frequency allocation uses slower algorithms and a certain allocation will be maintained for a longer period of time than in the case of dynamic channel allocation. Many suggestions for adaptive frequency allocation have been made.

U.S. Pat. No. 5,212,831 reveals a method for autonomous adaptive frequency allocation in a portable TDMA radio communication system. In the radio communication system described, each base station sends on an allocated frequency. A base station shuts off its own transmitter and measures the signal strength on all frequencies which the other base stations on the radio communication system are sending on. The frequency with the lowest measured signal strength is temporarily allocated to the measuring base station as a downlink frequency. Since each downlink frequency is associated with a certain uplink frequency, the base station is allocated a corresponding uplink frequency. The procedure is repeated by each base station in the system independently of each other and the process is thereafter iterated until all the base stations have been allocated a downlink frequency and the radio communication system has been stabilized.

One disadvantage of this method is that account is only taken of the quality of the downlink frequencies. The quality situation between uplink and downlink frequencies can differ substantially. A base station always sends from the same point in the cell while a mobile station sends from a geographic surface, and therefore the wave propagation in the uplink and downlink differs. When the uplink frequencies and the downlink frequencies are in two frequency bands with a certain duplex spacing, the frequency bands can be differentially affected by disturbances from other base stations and for example from microwave links. Especially in micro and pico cells, the interference on the uplink frequencies can vary rapidly and greatly since, for example, mobile stations can turn corners at high speed. Another disadvantage is that the base station must turn off its own transmitter during measurement since certain radio communication systems require that the base station, during an ongoing conversation, send continuously on the carrier wave where conversation is ongoing in some time slot. An additional disadvantage is that the base station must turn off its own transmitter during measurement. In the GSM-system, as was previously mentioned, transmission must be continuous on the BCCH-carrier.

U.S. Pat. No. 5,375,123 describes a method of allocating, to an unconnected mobile station, a downlink channel based on a local estimate of the interference to potential new downlinks. Measurement of the downlink frequencies can be done either by performing, on order from the base station, measurements from already connected mobile stations or from special measurement stations which are located in the cell. The measurement results 10 are then reported to the base station and the interference, which a new link would have on the respective downlink frequency, can be computed. Using the interference values obtained, the mobile station is allocated a downlink channel.

One disadvantage of this method is, as in the preceding case, that no account is taken of the interference situation on the uplink frequencies. An additional disadvantage is that measurements from the mobile stations of all available downlink frequencies are complicated to perform in the GSM-system, for example.

According to GSM-specifications, the mobile stations perform so-called MAHO-measurements (Mobile Assisted Handover) of the signal strength from the base stations in the neighbouring cells. In the GSM-specifications and other specifications there is no procedure specified which in any way uses measurements made from the mobile stations of all available frequencies or channels in a radio communication system. Measurements of mobile stations on the signal strength, for example, from anything other than base stations in neighbouring cells would thus require modifications of the radio communication system. In order to carry out measurements on all available frequencies from mobile stations, it will require complicated introduction of such a procedure.

The published patent application EP-0 585 994 reveals as previously known a mobile radio system with adaptive allocation of the radio channels. On the basis of measurement data measured during ongoing conversations on a radio channel which is in use, there occurs a change in the allocation of radio channels. Measurements are made from the mobile station and/or from the base station. Only measurements of the interference signal in the uplink are made from the base station.

One disadvantage of this method is that no consideration is taken of the interference situation in the downlink.

When selecting suitable frequencies or channels, the interference situation for those frequencies or channels which can conceivably be used, should be investigated. There can be a great difference between the uplink and downlink interferences. In order to obtain satisfactory results, the interference situation should be observed for both uplink and downlink communications.

DESCRIPTION OF THE INVENTION

The present invention addresses the problem of how to obtain a measure of the quality of the frequencies or channels in uplink and downlink in a radio communication system.

Another problem is how the quality is to be obtained for frequencies or channels to be used in a downlink without making measurements from the mobile stations.

An additional problem is how to obtain reliable measurements of the quality parameter of both uplink and downlink frequencies and channels in a simple and cost effective manner.

Another problem is how to obtain statistical information concerning the interference situation in a radio communication system.

An additional problem is how to utilize the obtained measurement values of the quality parameter for adaptive frequency or channel selection to the base stations in the radio communication system.

One purpose of the present invention is thus to obtain in a simple and cost-effective manner a measure of the quality in a radio communication system of frequencies or channels in uplink and downlink without measurements by the mobile stations.

An additional purpose is to use the information concerning the quality of the frequencies or channels in the radio communication system to obtain statistics on the interference situation in the radio communication system.

Another purpose is to utilize the information concerning the quality of uplink and downlink frequencies or channels for adaptive frequency or channel selection and to make possible automatic re-planning of the frequency or channel allocation in the radio communication system as needed.

Another purpose is to make possible the allocation of frequencies or channels locally in each base station independently of each other.

The solution to the problems is to measure from a number of base stations at least one quality parameter on both the uplink and the downlink channels. The measured values are averaged for each channel or each group of channels constituting a TDMA-frame, in other words for each frequency. The values obtained thereby of the quality parameter can be used to provide frequency or channel allocation or to provide statistical information concerning the radio communication system.

More particularly, the problems are solved by allowing each base station to perform measurement of a quality parameter for both uplink and downlink channels in the radio communication system. The measurement is thus done by the base station, and therefore the values obtained of the quality parameter for the channels in the down-link are estimated values. Agreement of the estimate with the actual quality situation on the downlink channels is best when the interference situation of the mobile stations and the interference situation of the base station are similar to each other, i.e. when the base station is placed at approximately the same height as a mobile station. In micro and pico cells, the base stations are placed below roof level, in contrast to macro cells, in which the base station antennae are at higher level. The agreement of the estimate with the actual interference situation on the downlink is thus best in cells with lowly placed base station antennae, such as in micro and pico cells.

At least one quality parameter is measured for a number of the available uplink and downlink channels in the system. The measurements are carried out from the base station on both the uplink channels and the downlink channels. The measured values are averaged for each channel or for each group of channels constituting a TDMA-frame, i.e. for each frequency. Each pair of uplink and downlink channel or frequency is ranked with regard to the quality parameter values obtained. A low value of the quality parameter indicates low interference, meaning that the quality is high.

The quality parameter measurement values obtained in the uplink and in the downlink can be utlized to provide statistical information concerning the interference situation of the radio communication system, for example the geographic extent of the interference.

The ranked frequency or channel pairs can also be used for adaptive frequency or channel allocation. At least one frequency or channel pair is then selected on the basis of the ranking. The highest ranked frequency pair can, for example, be selected as BCCH-carrier and a number of the successively lower ranked frequency pairs can be selected as carriers of speech channels.

The allocation of the selected frequency pairs or channel pairs can be done automatically by the radio communication system or be operator-controlled.

One advantage of the invention is that a measure of the quality of the downlink channels can be obtained without performing measurements from the mobile stations.

An additional advantage is that the obtained measure of the quality of the channels can provide statistical information concerning the interference situation in the radio communication system.

Another advantage is that the obtained measure of the quality of the channels can be utilized for adaptive frequency or channel allocation.

An additional advantage is that the frequency or channel allocation does not require manual measurements and will thus be simpler and more cost-effective.

Another advantage is that the process can be carried out locally in each base station without the various base stations having to exchange information.

The invention will now be described in more detail with the aid of preferred embodiments and with reference to the accompanying drawings.

PREFERRED EMBODIMENTS

In the examples described below, the invention will be described as if implemented in a radio communication system with fixed duplex spacing. The term "frequency pair" will be used to designate an uplink frequency and a downlink frequency associated therewith. The term "channel pair" will indicate in the same manner an uplink channel and its downlink channel.

Figure 1:
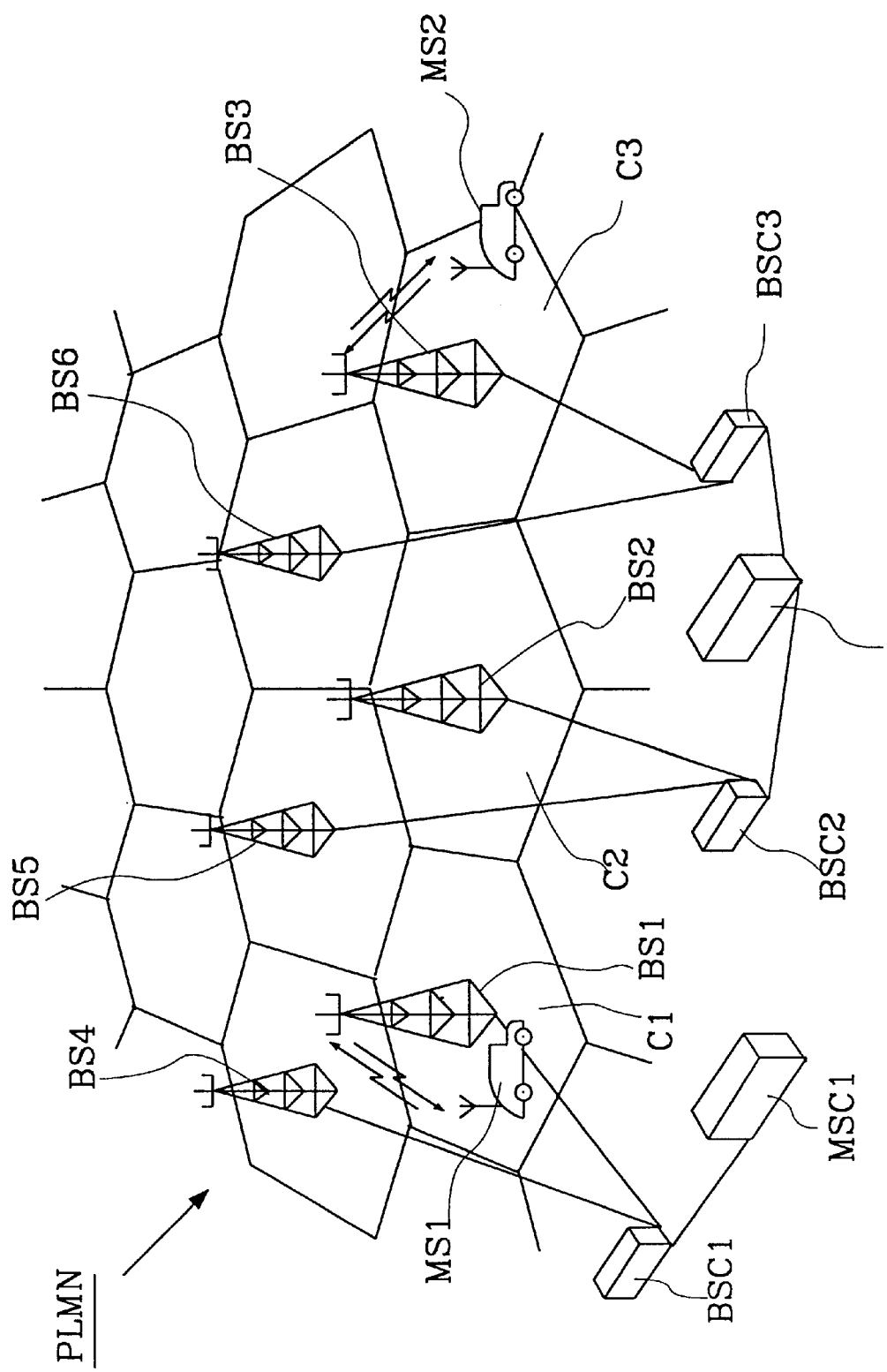
FIG. 1 shows a schematic view of a portion of a mobile radio communication system of the GSM-type.

FIG. 1 shows schematically a portion of a radio communication system. Said system is illustrated in FIG. 1 as a cellular mobile radionet PLMN, comprising base stations BS1–BS6. Each base station has a certain range within which radio communication can be established with mobile radio stations or mobile stations MS1–MS2 which are within the area of coverage. The cells C1–C3, which are drawn as hexagons in FIG. 1, represent these geographical areas of coverage for the base stations BS1–BS3. The mobile stations MS1–MS2 communicate with the base station in the cell in which they happen to be, via two-way radio channels.

Each base station BS1–BS6 comprises a number of transceivers for receiving signals on the uplink frequencies and transmitting signals on the downlink frequencies. The number of transceivers in a base station depends on how many frequencies the base station is allowed to use. A number of base stations BS2, BS5 are connected to a base station switching center BSC2 and a number of base station switching centers BSC2–BSC3 are connected to a mobile switching center MSC2.

Figure 2:
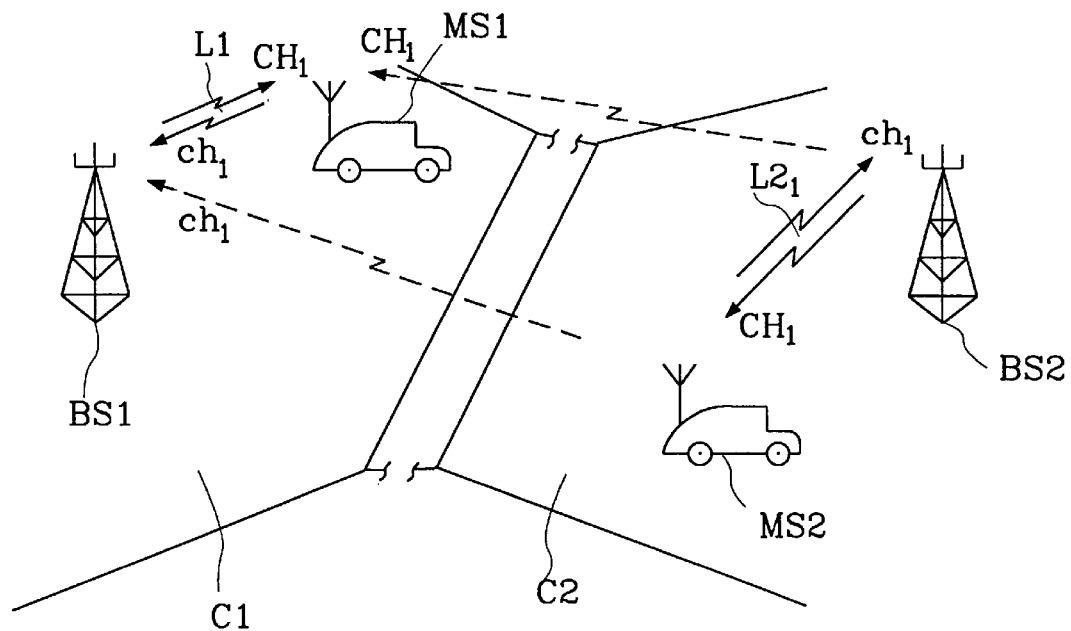
FIG. 2 shows a simplified sketch of co-channel interference between two base stations and two mobile stations.

FIG. 2 shows a simplified sketch of the interference situation for a base station and a mobile station which is affected by interference from another cell in a radio communication system. A first mobile station MS1 happens to be within the cover-age area of a first base station BS1, i.e. within a first cell C1. A second mobile station MS2 is within the coverage area of a second base station BS2, i.e. cell C2. The first mobile station MS1 communicates with its base station BS1 via a link L1 consisting of an uplink channel $ch_1$ and a downlink channel $CH_1$. The second mobile station MS2 communicates with its base station BS2 via another link L2 consisting of the same uplink channel $ch_1$ and downlink channel $CH_1$ as the first link L1.

Only the interference situation for the first base station BS1 and the first mobile station MS1 are illustrated in the Figure. The signals on the uplink channel $ch_1$ from the second mobile station MS2 also reach the first base station BS1, and the signals from the second base station BS2 on the downlink channel $CH_1$ also reach the first mobile station MS1, as indicated by the dashed lines from the second base station BS2 and from the second mobile station MS2. The signals which are transmitted on the channels from the second cell C2 interfere with the channels in the first cell C1. The signals are attenuated due to the distance between the two base stations. The interference from a source sending signals on the same frequency at the same time is called co-channel interference.

In the Figure, the two cells C1 and C2 are drawn for reasons of space as if they were nearby cells. In normal cases there is however, as described above, a certain re-use distance between the cells which are allowed to use the same channels. In a radio communication system, a plurality of cells can use the same channels at the same time, not only two cells as shown in the Figure, but the distances between the cells using channels on the same frequencies are usually relatively great. In the Figure there are therefore a number of cells between the first cell C1 and the second cell C2.

Figure 3:
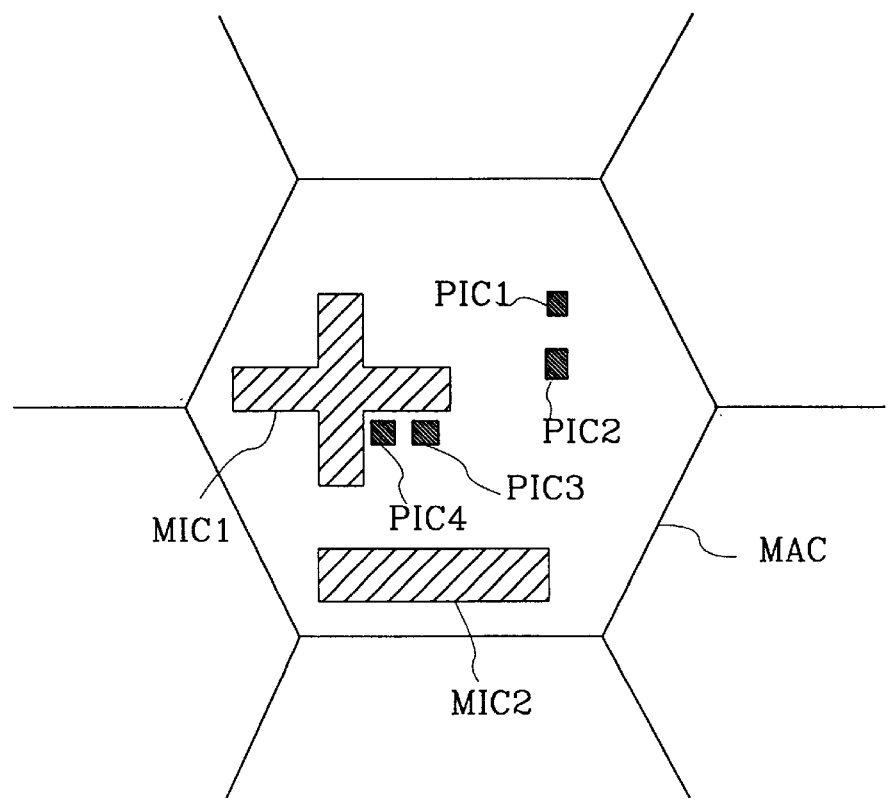
FIG. 3 shows a schematic sketch of a macro cell and a number of micro and pico cells located therein.

FIG. 3 shows a macro cell MAC as an umbrella cell for two micro cells MIC1, MIC2 and for four pico cells PIC1–PIC4. The micro cells can for example cover a road intersection MIC1, a road MIC2 or a sports arena. A pico cell can cover a floor in a building. As mentioned above, the base station antenna in a micro cell is placed below roof level, for example on a building wall or in a lamp post. A micro cell can also be an umbrella cell for a number of pico cells, but for the sake of clarity, the micro and pico cells have been drawn separately in FIG. 3.

Figure 4:
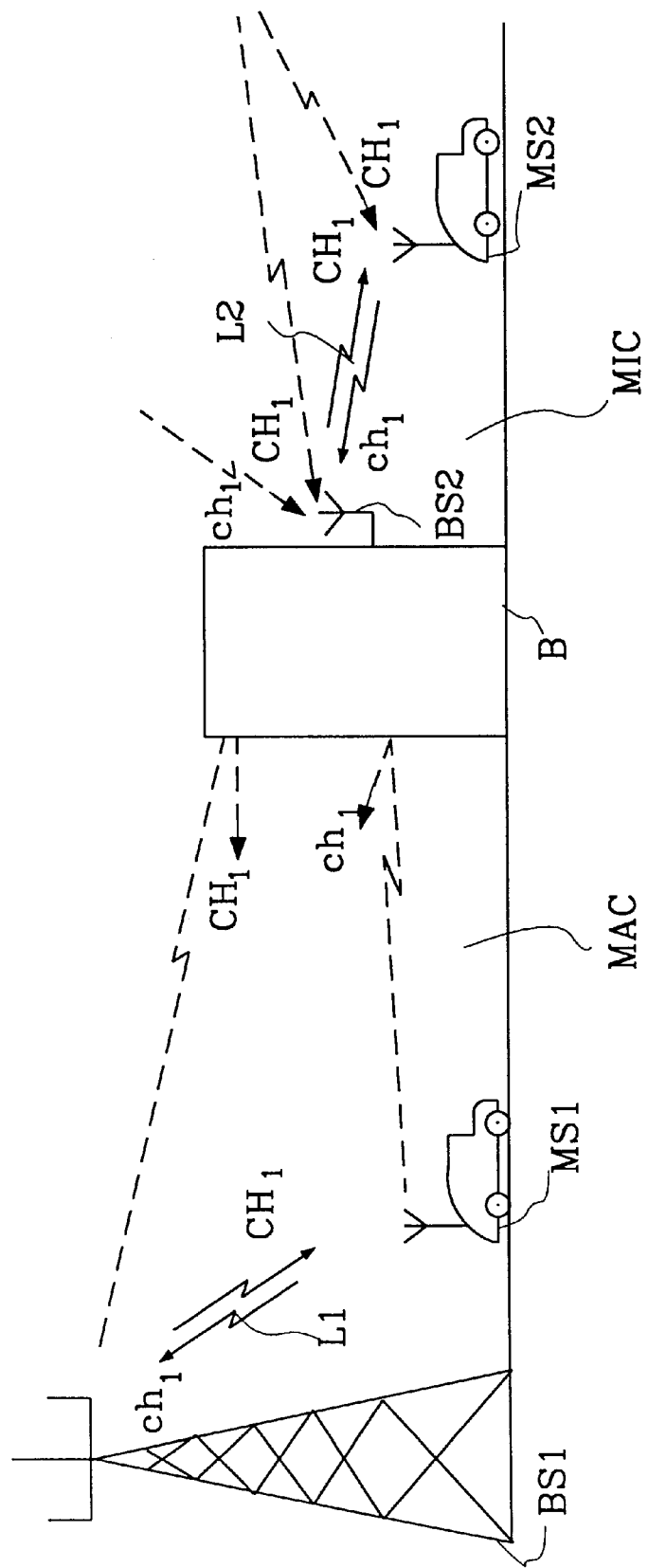
FIG. 4 shows a schematic sketch of a possible interference situation in a micro cell.

FIG. 4 shows a simplified sketch of a possible interference situation in a micro cell. A base station BS1 serving a macro cell MAC communicates with a first mobile station MS1 over a certain link L1 consisting of an uplink channel $ch_1$ and a downlink channel $CH_1$. On a building B a second base station BS2 is placed. This base station serves a micro cell MIC and within the micro cell there is a second mobile station MS2. The second mobile station MS2 and the second base station BS2 communicate via a link L2 consisting of the same radio channels $ch_1$ and $CH_1$ as the link L1 between the first base station BS1 and the first mobile station MS1.

In the situation shown, the second base station BS2 and the second mobile station MS2 are not affected by interference from the macro cell MAC due to the fact that the signals from the first mobile station MS1 and the first base station BS1 are spread against the wall of the building B and therefore do not reach the micro cell MIC, as indicated by the dashed lines. By introducing micro cells and pico cells in densely built up areas, channels can be re-used more often than in macro cells, and furthermore coverage is obtained everywhere in the geographical macro cell area.

Since the antenna of the mobile station MS2 is at similar height to the antenna of the base station BS2 in the micro cell MIC, the interference reaching the mobile station MS2 on the downlink channel $CH_1$ on which the mobile station MS2 receives, should also reach the base station. The interference in the micro cell MIC is indicated by dashed lines to the base station BS2 and to the mobile station MS2. This means that if the base station BS2 is capable not only of receiving signals on the uplink channels but also on the downlink channels, an approximate value of the interference reaching the mobile station MS2 should be able to be obtained by measurement on the downlink channel $CH_1$ made by the base station BS2.

Figure 5:
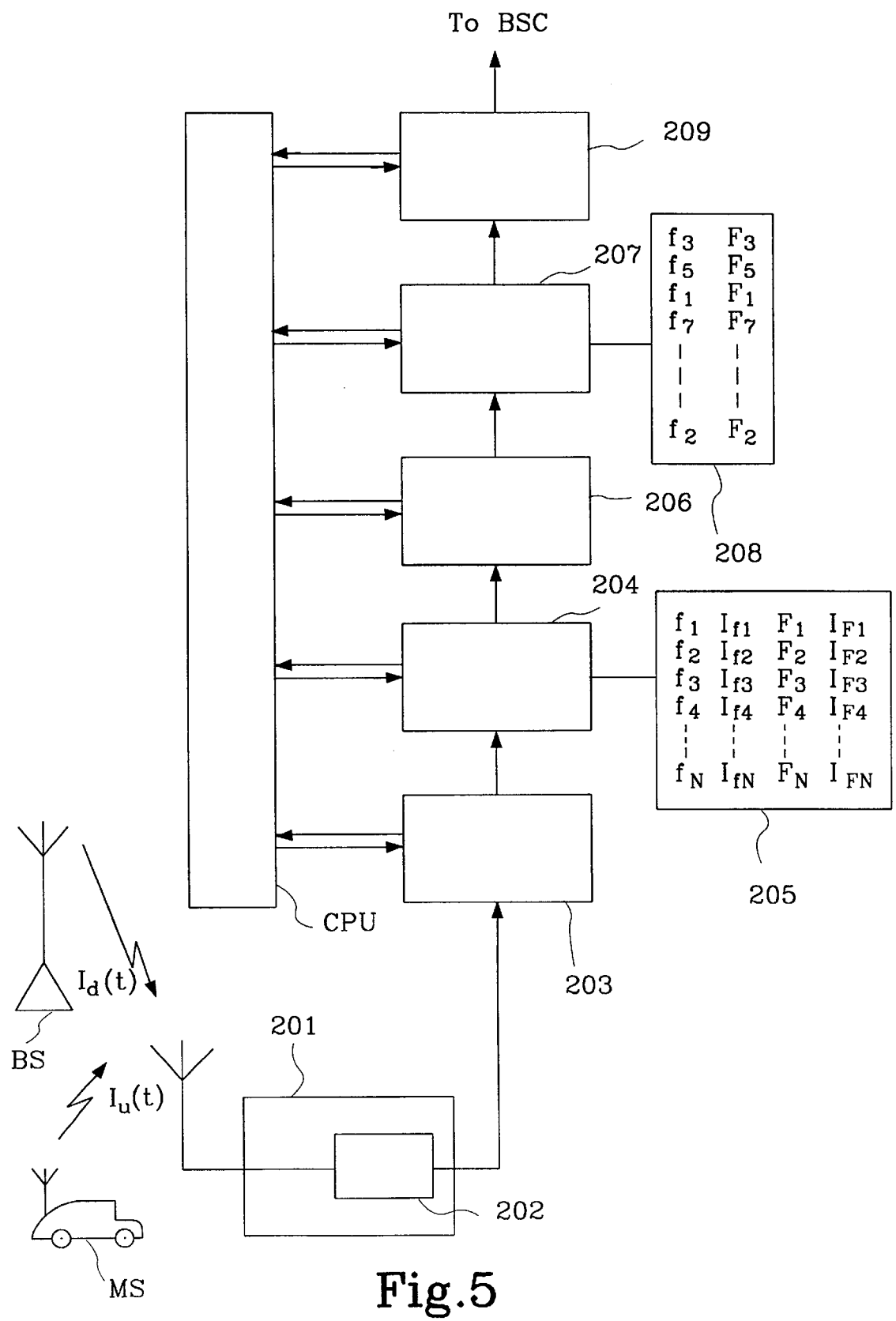
FIG. 5 shows a block diagram for one embodiment of the device according to the invention.

FIG. 5 shows a first embodiment of the means which are essential for the invention in the form of a block diagram. In the present example the means are comprised in the respective base station in a layer with micro or pico cells and they are used for adaptive frequency selection. The base station comprises a measuring receiver 201, which can receive radio signals on all available uplink and downlink channels or a desired subset of the same. The measuring receiver 201 comprises means 202 for generating a quality parameter. The quality parameter is in general time-dependent and indicates the quality of a channel with regard to interference I(t), for example. The interference $I_u(t)$ on the uplink will come substantially from other mobile stations in the radio communication system, which is indicated in the Figure by a signal arrow from a mobile station MS. The interference $I_d(t)$ on the downlink is essentially signals from other base stations in the radio communication system, which is indicated by a signal arrow from a base station BS in the Figure. The means 202 for generating a quality parameter can then be a signal strength meter. It is also possible to measure other parameters, such as the bit error ratio BER or the C/I-value, and from these values calculate a value of the interference.

The measuring receiver 201 can be the receiving part of a transceiver in the base station if the transceivers in the base station are made to be able to receive on the available downlink channels of the system as well. It can, however, be an advantage to have a special receiver for making measurements according to the invention since the transceivers already in the base station can have problems in carrying out their usual tasks at the same time as they carry out the measuring process according to the invention. The measuring receiver can then be an extra receiver in the base station only intended to perform measurements according to the invention.

The measuring receiver 201 can be a wide-band receiver receiving an average value of the quality parameter, whereafter the received wide-band signal is filtered by means of a channel filtering means so that a value is obtained for each channel in uplink and downlink or an average value for a number of channels included in a TDMA-frame, i.e. for each frequency.

The measuring receiver 201 can be a receiver which scans the channels and measures their signal strength. In the following description, it is assumed that the measuring receiver is a receiver which scans over uplink and downlink channels a number of times and measures a value of the quality parameter for each channel or an average value for the channels included in each TDMA-frame, i.e. for each frequency, and for each sweep. In order to obtain many measuring values, a sweep should be rapid, for example on the order of one sweep per second/minute, while the total measuring time, the generation interval $\Delta T$, can for example be on the order of magnitude of days to weeks.

In the present example an average value of the quality parameter for uplink and downlink frequencies in the radio communication system is generated. A value of the quality parameter can either be generated on all frequencies available in the system or on all frequencies which are not used for its own cell or on another subset of the available frequencies. The number of frequency pairs to be evaluated is designated N.

In certain cases it is not suitable to allot to a certain cell a certain frequency. If the cell in question is a micro cell and it has an umbrella cell, it can for example be desirable not to allow the micro cell to use the same frequency as its umbrella cell due to the risk of interference. Frequencies used in neighbour cells can also be suitable to except from further processing. If measurement occurs on a frequency used in that same cell, the contribution to the quality parameter from that cell should be subtracted from the measured value if a correct value of the interference is to be obtained.

For the respective frequency $f_1-f_N$ for which a value of the quality parameter has been generated, there will be an averaging of the quality parameter by means of an averaging means 203. The averaging means 203 can utilize an unambiguous, monotonically increasing nonlinear mapping (for example a logarithmic function) for the purpose of weighting various measurements. It is suitable thereafter to perform a linear averaging.

It may be desirable to compare the obtained values of the quality parameter with a predetermined threshold value $I_{max}$ before further analysis is performed. It is also possible that different threshold values for uplink and downlink frequencies can be used. It is also conceivable that it is more important to have good quality on the uplink than on the downlink, for example. If some uplink or downlink frequency should have obtained an excessively, high value of the quality parameter, the entire frequency pair can then be removed from further processing even if the other frequency in the pair obtained a satisfactory quality.

Even if generation of the quality parameter has been carried out on all available frequencies in the radio communication system, frequencies used by a macro cell, as was mentioned previously, can be considered to be disturbing for a micro cell located in the same geographic area as the macro cell, i.e. if the macro cell is an umbrella cell for the micro cell. These frequencies can then be excluded from further processing. It is also possible to exclude frequencies used in neighbour cells for the same reason as for frequencies in macro cells.

The measured values obtained for uplink and downlink frequencies $f_1-f_N$, $F_1-F_N$ which are to be evaluated, are stored by a first storage means 204. The storage means 204 can, for example, store the uplink frequencies $f_1-f_N$ and the downlink frequencies $F_1-F_N$ and the values associated therewith of the quality parameter $I_{f1}-I_{fN}$ and $I_{F1}-I_{FN}$ in a first measurement matrix 205. The measurement matrix 205 can, as seen in FIG. 5, be an N*4-matrix where the uplink frequencies $f_1-f_N$ are stored in the first column and the values of the quality parameter $I_{f1}-I_{fN}$ associated therewith are stored in the second column. In the third column the downlink frequencies $F_1-F_N$ can be stored and in the fourth column the values of the quality parameter $I_{F1}-I_{FN}$ associated with the downlink frequencies can then be stored. The storage can of course be done otherwise, for example in separate vectors, in an uplink and a downlink matrix or in other forms.

After the averaging, the frequency pairs $(f_1,F_1)-(f_N,F_N)$ are sorted by a sorting means 206 with regard to the quality parameter for both the uplink and downlink frequencies. In connection with the sorting, the measured values in the uplink and downlink are weighted, if so desired. The uplink and downlink measured values can be given different weight depending on whether it is regarded as more important to have a good uplink connection than a good downlink connection, or vice versa. Since important processes, such as handover, take place on the BCCH-carrier down-link frequency, it can be advisable for example to weight the downlink values higher than the uplink values.

The sum of the weighted or unweighted values of the quality parameter for the respective frequency pairs are compared thereafter, and the frequency pair with the lowest sum is the best with regard to frequency quality and is ranked highest, the frequency pair with the next lowest sum is ranked second highest, and so forth.

The ranked frequency pairs are then stored by a second storage means 207. The storage can be done in a second measurement matrix 208, which can be an N*2-matrix, where the uplink frequency of the highest ranked frequency pair is stored in the first column on the first row and the downlink frequency associated therewith is stored in the second column on the first row, and so forth. The storage can of course be done in another form.

In the present embodiment, the measuring method according to the invention is used for adaptive frequency selection. An allocation means 209 then selects frequencies to the base station. It is possible to combine the information from the generated values of the quality parameter with measurements of other parameters. Measurements which mobile stations perform of the signal strength of the base stations, MAHO-measurements, can be used for example in the frequency selection. Depending on which type of frequency planning is intended and for which frequencies the generation of the quality parameter has been done, the selection can proceed in various ways, which will be described in connection with the flow chart of the process shown in FIG. 6.

The allocation means 209 can thereafter allocate the selected frequencies to the base station. The allocation can be done directly by the allocation means 209 or, after asking the operator or after decision by the base station switching center BSC. If the base itself performs the updating, the base station switching center BSC must be informed of the updating in order to update its information concerning the base station in question. This is indicated in FIG. 5 by the dashed line from the allocation means 209 to the base station switching center BSC.

If the allocation is operator-controlled, the operator is informed of the selected frequencies and the operator decides whether updating is to take place or not.

In order to illustrate, in a simple and easily grasped manner, the control of the means of the invention, FIG. 5 shows a control means CPU. This control means CPU can communicate with the above described means and control the described process. The communication can occur via control signals sent between the control means CPU and said means, whereby the control signals are sent on a bus between said means, as schematically indicated in FIG. 5. The control of the various means according to the invention need not of course take place from a central control unit CPU. Each means can comprise its own software for controlling its functions, and the controlling can be distributed in the system.

In another example, a value of the quality parameter is generated for channels in the radio communication system in the same manner as described for the case of frequencies above. A value of a quality parameter for each channel in the radio communication system, or for a subset of the available channels, is then measured by means of the measuring receiver 201, whereafter averaging and storing of the quality parameter and the channels as well as sorting and selection of channel can be carried out as described above in connection with FIG. 5. The sorted channels can then be used for adaptive channel selection. The allocation of channels can be done in a similar manner as in the case of frequency allocation above.

In another example, the generated values of the quality parameter for frequencies and channels are used to provide statistical information concerning the radio communication system. It is then possible to obtain information concerning the geographical extent of the interference in the radio communication system, for example. In the present case, values of the quality parameter are taken by means of the measuring receiver 201 and averaged by an averaging means, such as was described in connection with FIG. 5. In the present case, the averaged measuring values obtained for the respective frequency or channel can be of interest for statistical information without being sorted, and therefore sorting means are not necessary. The sorted or unsorted values of the quality parameter can be reported to an operator, who evaluates the results of the measurement.

In all of the examples, the generation of the quality parameter takes place locally in each base station (BS1-BS6 in FIG. 1). Generation can, for example, take place continuously or during a certain period each day, suitably during high traffic. All or portions of the continued treatment of the generated values of the quality parameter can take place locally in each base station, as described above, or completely or partially be performed by other nodes in the radio communication system, such as the base station switching center BSC or the mobile switching center MSC.

Even if all data processing occurs in the base station, it is for example possible to allow the base station switching center BSC to make the decision concerning whether updating of frequencies/channels is to take place or not, and if so, the base station BS is ordered to make the allocation. If instead the base station BS itself performs the updating of the frequencies or channels, the base station switching center BSC must be informed of the updating so that it can in turn update its information concerning the base station in question.

It is also conceivable that the generated values of the quality parameter can be used directly by an allocation means, so that sorting means and storage means are not necessary. The allocation means comprises in this case means for being able to select those frequency pairs or channel pairs which are the best as regards the quality parameter.

Figure 6:
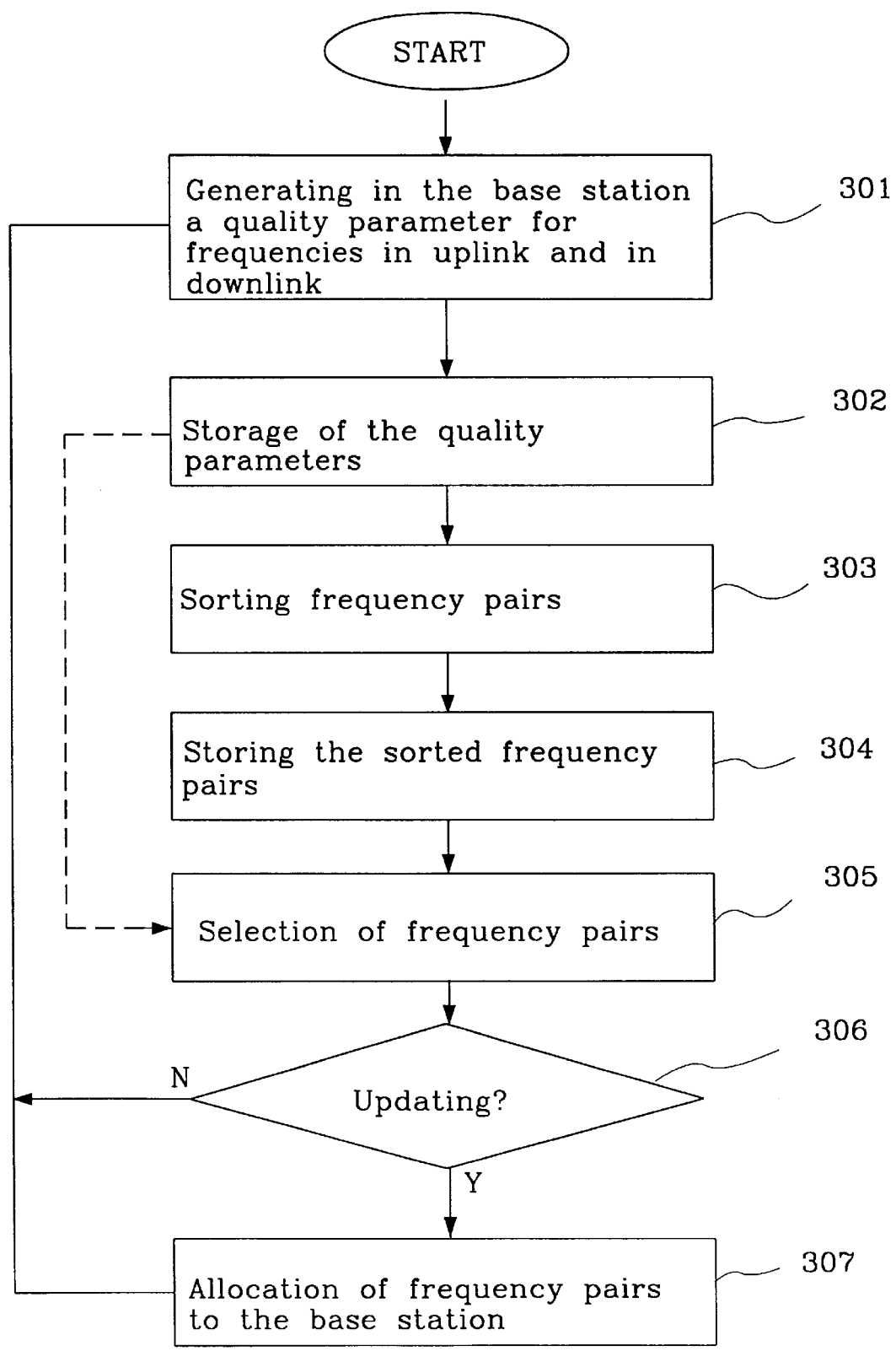
FIG. 6 shows a schematic flow chart of the process according to the invention.

FIG. 6 illustrates a flow chart of the process according to the invention when it is used for adaptive frequency selection. As was mentioned previously, it is also possible in a similar manner to use the process for adaptive channel selection, for example. An additional application is to use the process to provide statistical information concerning the radio communication system. The process according to the invention can be used in applications where there is desired a value of the quality of frequencies or channels used in the uplink and frequencies or channels used in the downlink.

In step 301, a channel quality parameter is generated for all or a subset of the frequencies available in the system for uplink and downlink. The generation takes place from the respective base station in a radio communication system with micro cells, for example. It is possible, for example, to only generate a quality parameter for frequencies or channels which are not used in that same cell.

In step 302, the generated values of the quality parameter $I_{f1}-I_{fN}$, $I_{F1}-I_{FN}$ with associated frequencies $f_1-f_N$, $F_1-F_N$, for example in an N*4-matrix, as described previously in connection with FIG. 5. When stored, the generated values of the quality parameter can be compared with a predetermined threshold value $I_{max}$, so that only frequencies the quality parameter of which is higher than the threshold value Imax are stored for further processing. It can be desirable to remove frequencies for other reasons than poor quality. As was mentioned previously, frequencies used by macro cells which are umbrella cells for a number of micro cells are considered to be disturbing for the micro cells. It is also possible to sort out frequencies used in neighbour cells.

If measurement of the quality parameter has been done for frequencies used in that same cell, then the contribution of the cell in question to the quality parameter must be subtracted from the generated value.

In step 303, the frequency pairs are sorted with regard to the sum of the generated values of the quality parameter for the frequencies included in the frequency pair.

A frequency pair with low composite quality parameter, for example low interference, has high quality and is thus ranked high, and so on. When sorting, the uplink and downlink frequencies are weighted relative to each other, as mentioned above in connection with the description of FIG. 5.

In step 304, the sorted frequency pairs are stored, for example in an N*2-matrix, as described earlier in connection with FIG. 5.

In step 305, frequencies are selected to be allocated to the respective base station.

In each base station, the best frequency pair can be selected as a new BCCH-carrier. If new carriers of speech channels are also to be allocated to the base station, a number of frequency pairs ranked successively after the best frequency pair can be selected as carriers of speech channels. The same number of frequency pairs as the number of transceivers in the base station can thus be selected.

If frequency hopping is permissible in the radio communication system, the number of frequencies to be allocated to the base station can be more than the number of transceivers, depending on the fact that each transceiver can be allowed to jump between a number of frequencies.

If the quality parameter has only been generated for the frequencies in uplink and downlink in the radio communication system which are not used in that cell, there will of course be a certain amount of uncertainty concerning whether the best ranked frequency pair actually is the best frequency pair in the radio communication system with regard to the quality parameter. If after replacing a frequency pair it is determined that the old frequency pair was better, this will automatically be corrected after an additional measurement, at which time the frequency pair can be changed back again.

The process according to the invention can be used to only perform or suggest change of the BCCH-carrier. The selection and allocation of frequency pairs to be used as carriers of speech channels can in this case be done by some other process.

In step 306, it is decided whether updating can occur of the frequency pairs selected previously for the respective base stations. If the answer is "No", alternative N, the process is repeated from step 301 without any updating having been performed.

If the answer is "Yes", alternative Y, in steps 307 the selected frequency pairs are allocated to the respective base station. As mentioned previously in connection with FIG. 5, the decision to update can be operator-controlled or system-controlled. Replacement can be done continuously or, for example, only if the operator or a node in the radio communication system reports poor signal strength or high bit error ratio or in some other way detects a deteriorating quality of the present link. The updating need not be complete, i.e. all frequency pairs or channel pairs need not be replaced, only the BCCH-carrier or the frequency pairs which have proved to be of poor quality. Any replacement of BCCH-carrier should be done during low traffic.

The process is repeated after step 307, there being a jump back to step 301.

The process according to the invention is performed locally in each base station and the respective base stations need not exchange any information between them. As mentioned in connection with FIG. 5, the base station switching center BSC for the respective base stations must be informed of updating of frequencies or channels.

The invention can also be implemented without continuous generation of the quality parameter. A measurement of a value of the quality parameter for each frequency or channel can, for example, occur when starting up the radio communication system. At a subsequent updating of the radio communication system, a new set of frequency pairs or channel pairs can be generated by using the process according to the invention. This set of frequency pairs or channel pairs can then be used for the next updating, and so on.

The radio communication system has in the preferred embodiments been described as comprising base stations, where channels available in the respective coverage areas of the base stations are used in radio communication with the mobile stations which happen to be located within the coverage area of a certain base station. The base station can in general be regarded as a primary radio station and the mobile stations as a number of secondary radio stations.

As mentioned previously, it is possible to implement those portions of the embodiments described having to do with treatment of measuring data, in a base station switching center BSC or in a mobile switching center MSC. In this case these nodes comprise means for achieving functionality of the above described means.

The quality parameter values generated for the downlink frequencies are, when measured from the base station, an approximation of the actual downlink values. As previously mentioned, this approximation is reliable in a micro or pico cell due to the fact that the base stations in the present case are relatively lowly placed, at roof level. The measurement can also take place from a so-called Home Base Station, which is a base station which can be coupled to the telephone jack in the home, for example, and which enables a cellular telephone to function as a cordless telephone. In the types of base stations mentioned above, only a small percentage of the interference signals from interference sources in the radio communication system are received as compared with a base station in a macro cell. This means that the interference situation for the base station can be regarded as approximately equal to the interference situation for the mobile stations with low antennae.

What is claimed is:

1. A process in a radio communication system for obtaining a measure of the quality of a plurality of channels available, said radio system comprising at least one primary radio station and at least one secondary radio station comprising the steps of:

establishing links via uplink and downlink channels, said channels capable of being affected by interference; and generating a quality parameter based on measurements made by the at least one primary radio station without reporting from the at least one secondary radio station for both channels intended to be used as up-link channels and downlink channels;

wherein interference situations of the at least one primary radio station and the at least one secondary radio station are similar to each other.

2. Process according to claim 1, wherein said generation step comprises:

measuring the quality parameter on a number of uplink channels and downlink channels during a generation interval; and storage of an averaged value of the quality parameter for the respective uplink channel and the respective downlink channel.

3. The process according to claim 1, in a Time Division Multiple Access system where communication occurs between said primary and secondary radio station in TDMA-frames, each of which is divided into a number of time slots via an uplink and downlink frequency, said generation step comprises;

measuring the quality parameter on a number of uplink channels and downlink channels during a generation interval;

averaging the quality parameter over the channels included in the respective TDMA frame, thus obtaining an averaged value for each uplink frequency and downlink frequency; and storage of the averaged values of the quality parameter for the respective uplink frequency and downlink frequency.

4. A process according to claim 2, wherein said generation step occurs for all channels available in said radio communication system.

5. A process according to claim 4 further comprising the steps;
subtracting from the computed average of the quality parameter for the primary station, the contribution made by channels used in a connected link within the coverage area of said primary station to obtain a new quality parameter; and
replacing the previous value of the quality parameter.

6. The process according to claim 1, wherein those channels used in a connected link within the coverage area of a primary station are excepted from the generation of the quality parameter for the primary station in question.

7. The process according to claim 1 further comprising the step;
excepting the values of the quality parameter exceeding a predetermined threshold from storage.

8. The process according to claim 1, further comprising;
sorting of frequency pairs which comprise an uplink frequency and a downlink frequency, said frequencies being separated by means of a duplex spacing; and
said sorting being done on the basis of said measured values of the quality parameter for the frequencies included in the respective frequency pairs, said frequency pair having the lowest composite value of the quality parameter being ranked highest and said frequency pairs having successively lower composite values being ranked successively lower.

9. The process according to claim 1, further comprising;
sorting of channel pairs which comprise an uplink channel and a downlink channel, said channel being separated by means of a duplex spacing; and
said sorting being done on the basis of said channels included in the respective channel pairs, said channel pair having the lowest composite value of the quality parameter being ranked highest and said frequency pairs having successively lower composite values being ranked successively lower.

10. The process according to claim 8, further comprising;
weighing the stored values of the quality parameter in relation to each other during sorting.

11. The process according to claim 8, further comprising;
said sorted frequency pairs forming a base for adaptive frequency selection.

12. The process according to claim 11, further comprising selecting the highest ranked frequency pair as a new BCCH-carrier.

13. The process according to claim 12, further comprising;
selecting as carriers of speech channels the next frequency pairs ranked successively lower to the highest ranked frequency pair.

14. The process according to claim 9, further comprising:
said sorted channel pairs forming a basis for adaptive channel selection.

15. The process according to claim 12, further comprising;
making decisions concerning updating of the base station with the selected frequencies or channels by a base station.

16. The process according to claim 12, further comprising;
making decisions concerning updating the base station with the selected frequencies or channels by a base station switching center.

17. The process according to claim 12, further comprising;
making decisions concerning updating the base station with the selected frequencies or channels by an operator.

18. The process according to claim 15, wherein said updating step is performed locally in the respective base station.

19. The process according to claim 1, further comprising;
using said measured values of the quality parameter to provide statistical information concerning said radio communication system.

20. The process according to claim 1, wherein said measured quality parameter is interference.

21. The process according to claim 1, wherein said measured quality parameter is the bit error ratio (BER).

22. The process according to claim 1, wherein said measured quality parameter is the C/I value.

23. The process according to claim 1, wherein said generation interval is on the order of magnitude of days to weeks.

24. The process according to claim 1, further comprising:
performing said process in micro cells, wherein interference situations of the at least one primary radio station and the at least one secondary radio station are similar to each other.

25. The process according to claim 1, further comprising:
performing said process in pico cells, wherein interference situations of the at least one primary radio station and the at least one secondary radio station are similar to each other.

26. A radio communication system with at least one primary radio station and at least one secondary radio station between which two way links can be established through uplink channels and downlink channels, said channels capable of being affected by interference, said system comprising:
one or more receivers included in the at least one primary radio station for measuring a quality parameter without reporting from the at least one secondary radio station both on uplink channels and on downlink channels;
wherein interference situations of the at least one primary radio station and the at least one secondary radio station are similar to each other.

27. A radio communication system according to claim 26, wherein said receiver measures a value of the quality parameter for all uplink and downlink channels in said system.

28. A radio communication system according to claim 26, wherein said receiver measures a value of the quantity parameter for a subset of uplink and downlink channels in the radio communication system.

29. A radio communication system according to claim 26 further comprising;
averaging means for averaging the measured values of the quality parameter for a respective channel during a generation interval;
storage means for storing the average values of the quality parameter;
sorting means for ranking channel pairs further comprising an uplink channel and a downlink channel, said channels being separated by duplex spacing means;
storage means for storing said ranked channel pairs;
allocation means for selecting channel pairs and for allocating channel pairs to the base station in question; and
control means for controlling the generation of the quality channel parameter and for controlling the choice and allocation of channel pairs to the respective first radio stations.

30. Said radio communication system according to claim 26, in a Time Division Multiple Access system where communication occurs between said primary and secondary radio station occurs in TDMA-frames, each of which is divided into a number of time slots via an uplink and downlink frequency, said system further comprising;

averaging means for averaging the measured values of the quality parameter for the respective group of channels during a generation interval;

storage means for storing the average values of the quality parameter;

sorting means for ranking channel pairs further comprising an uplink channel and a downlink channel, said channels being separated by duplex spacing means;

storage means for storing said ranked channel pairs;

allocation means for selecting channel pairs and for allocating channel pairs to the base station in question; and control means for controlling the generation of the quality channel parameter and for controlling the choice and allocation of channel pairs to the respective first radio stations.

31. A radio receiver included in a primary radio station of a radio communication system comprising:

a measurement device which measures a quality parameter without reporting from at least one secondary radio station included in the communication system both in channels to be used as uplink channels and channels to be used as downlink channels in said radio system;

wherein interference situations of the primary radio station and the at least one secondary radio station are similar to each other.

32. The receiver of claim 31, wherein the receiver is disposed such that interference situations of the uplink channels and the downlink channels are similar to each other.

* * * * *